United States Patent [19]

Watanabe et al.

[11] Patent Number: 5,214,666
[45] Date of Patent: May 25, 1993

[54] SOLID STATE LASER OSCILLATOR

[75] Inventors: Mitsuyoshi Watanabe; Makoto Suzuki, both of Nagoya, Japan

[73] Assignee: Brother Kogyo Kabushiki Kaisha, Aichi, Japan

[21] Appl. No.: 728,894

[22] Filed: Jul. 10, 1991

[30] Foreign Application Priority Data

Jul. 12, 1990 [JP] Japan .................................. 2-184865

[51] Int. Cl.[5] .............................................. H01S 3/09
[52] U.S. Cl. ........................................ 372/69; 372/31; 372/32; 372/21
[58] Field of Search ..................... 372/38, 23, 70, 69, 372/31, 32, 21

[56] References Cited

U.S. PATENT DOCUMENTS

| 3,806,829 | 4/1974 | Duston et al. | 372/38 |
| 4,942,587 | 7/1990 | Suzuki | 372/70 |
| 4,977,561 | 12/1990 | Ibe et al. | 372/23 |

Primary Examiner—Leon Scott, Jr.
Attorney, Agent, or Firm—Kane, Dalsimer, Sullivan, Kurucz, Levy, Eisele and Richard

[57] ABSTRACT

A solid-state laser oscillator has a semiconductor laser for biasing a solid-state laser to a threshold value or more and a semiconductor laser for pulse-pumping the solid-state laser. A pulse pump light having a pulse width which is equal to a cycle of relaxation oscillation or more is fed to the solid-state laser through the semiconductor laser for pulse pump thereby to suppress remarkably a relaxation oscillation.

10 Claims, 6 Drawing Sheets

SOLID STATE LASER OSCILLATOR

BACKGROUND OF THE INVENTION

This invention relates to a solid-state laser oscillator which pumps a solid-state laser with a light output from a semiconductor laser to emit a laser beam therefrom.

Conventionally, in the field of this type of solid-state laser oscillator, a system wherein a laser beam output from a solid-state laser is modulated with an external modulator such as an acoustic optical element, and a system wherein modulation is made by modulating a semiconductor laser (called LD hereinafter) for pumping a solid-state laser and feeding a light output from the modulated LD to the solid-state laser are generally known as a system to modulate an output laser beam.

In order to shorten a rise time of a laser beam output from a solid-state laser based on the latter system, the following measures can be applied. In brief, two pieces of LD are arranged in a solid laser, and one of the two LDs is used to pump the solid-state laser to a threshold value or a value more than the threshold beforehand and a pulse pump light from the other LD which performs pulse pump according to a modulation signal is applied to the solid-state laser (This system is called bias pump system hereinafter).

In the aforesaid external modulation system, however, it is difficult to build a system having a compact configuration, which is one of the reasons for raising the system cost.

Also, in the aforesaid bias pump system, as a response speed of the solid-state laser is lower than a modulation breaking or interrupting speed in the LD, change of output from the solid laser can not follow change of output from the LD in the case of high speed modulation. For this reason, as shown by a character $b_1$ (indicating output from the solid-state laser) in FIG. 10, a "relaxation oscillation" as described hereinafter occurs after outputs $P_1$ and $P_2$ from the solid-state laser, noises $n_1$ and $n_2$ are generated after fall of the outputs $P_1$ and $P_2$ from the solid-state laser. A character $a_1$ (indicating a pulse output from the LD) shows a case where bias pump (for instance, 44 mW) is made first and pulse pump (for instance, 66 mW) is added to it. Because of the aforesaid noises $n_1$ and $n_2$, accurate modulation according to an external signal can not be made, and if this type of noise is generated, for instance, in a so-called laser printer during printing, bleeding or blur of outline of printed letters or figures occur.

Herein, the "relaxation oscillation" is generally defined as oscillation which occurs from a time when an external force is loaded to a system in balance and a new balanced state is established until a time when the aforesaid external force is removed to restore the original balanced state. A process where the "relaxation oscillation" in a laser beam occurs is as described below.

In other words, when a light output from an LD is constant, a population inversion density of a solid-state laser to which this output light is fed and a light density in the solid-state laser (a light output from the solid-state laser is in proportion to this light density) are also constant. Further, when output of light from the LD increases (for instance during rise of an LD pulse), a population inversion density in the solid-state laser increases and a light density in the solid-state laser increases. The aforesaid increase of a light density causes reduction of a population inversion density through increase of a stimulated emission rate which is proportional to the light density. Because of this reduction of population inversion density, the light density decreases, and the population inversion density again increases through decrease of the stimulated emission rate.

The repetition described above is continued at a constant cycle until output from the solid-state laser is stabilized, and this process is called "relaxation oscillation". The above-described process is also generated when output from an LD decreases at the time of fall of an LD pulse. In this case, however, the process is started from decrease of the population inversion density.

SUMMARY OF THE INVENTION

It is an object to provide a compact and low cost solid-state laser oscillator which allows high speed modulation.

According to this invention, there is provided a solid-state laser oscillator in which a light output from a pumping laser light generating means is fed to a solid-state laser to emit a laser light therefrom, the laser light being followed by a cycle of relaxation oscillation, comprising a control section which controls so as to feed a pulse pumping light having a pulse width which is equal to a period of one cycle of said relaxation oscillation, or integer times of said period of relaxation oscillation, from said pumping laser light generating means to said solid-state laser.

DESCRIPTION OF THE PREFERRED EMBODIMENT

Description is made below for an embodiment of this invention with reference to the drawings.

Figure 1:
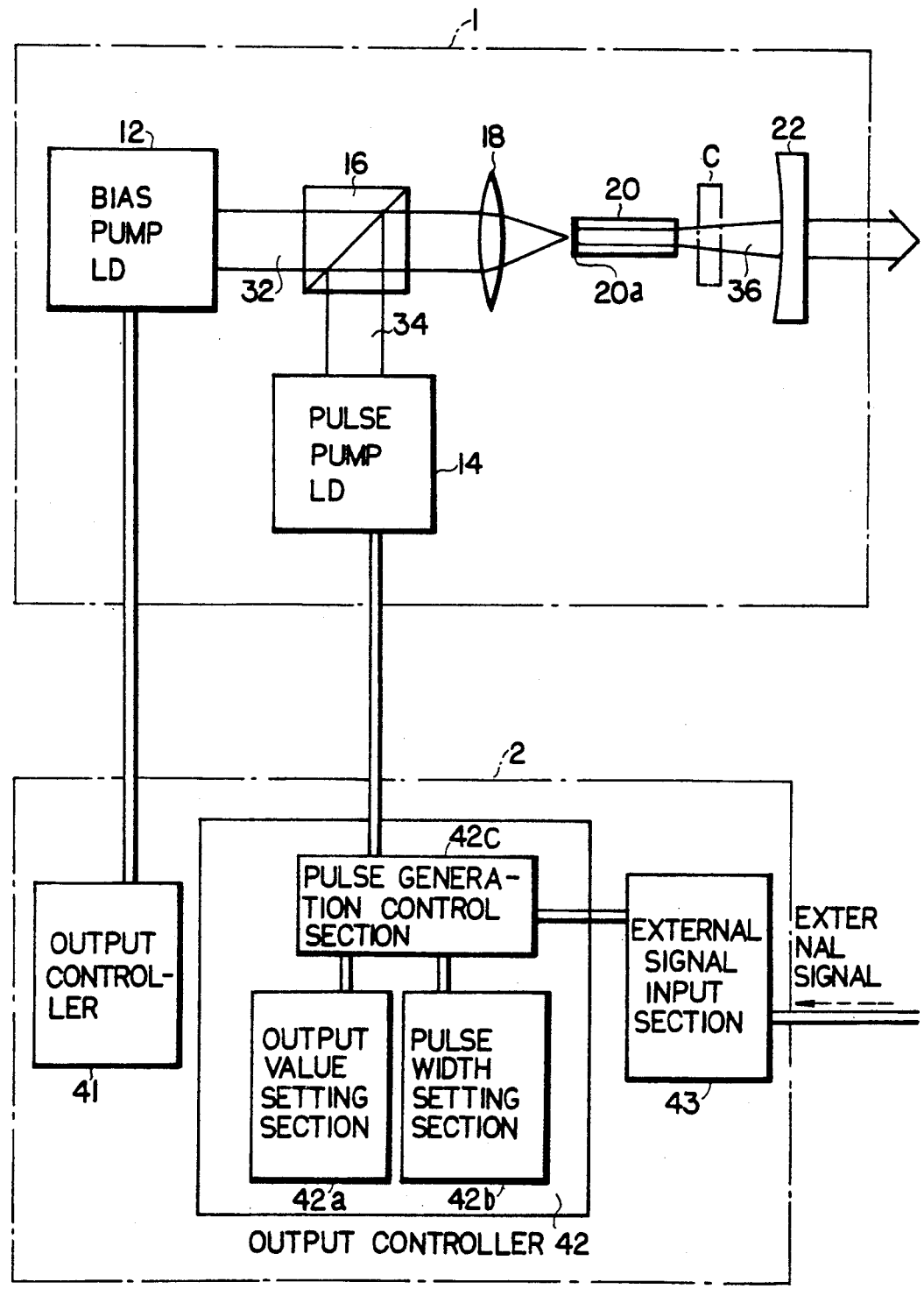
FIG. 1 is a block diagram of an embodiment of this invention.

FIG. 1 is a block diagram of a solid-state laser oscillator in the embodiment of this invention. As shown in FIG. 1, the solid-state laser oscillator comprises a laser beam output section 1 and a control section 2 connected to the laser beam output section 1.

The laser output section 1 comprises an LD 12 for bias pump to keep the solid-state laser biased to a threshold value for pump or more, an LD 14 for pulse pump to add a pulse for modulation, a polarized beam splitter 16 to sum or combine two output lights from the LDs 12, 14, a condenser lens 18 to condense the output lights onto an end face of a Nd:YAG rod 20, an Nd:YAG rod 20 which is a type of solid-state laser material, and an output mirror 22. Coating with a high transmission rate to a pump light from the LDs and a high reflectance to an output light from the Nd:YAG laser is applied to an end face 20a of the Nd:YAG rod 20. The Nd:YAG rod 20 and the output mirror 22 constitute an optical resonator R.

The two LDs 12, 14 form a pump laser light generating means.

The control section 2 comprises a first output controller 41 which maintains output from the LD 12 for bias pump at a constant level (bias value), a second output controller 42 which sets output from the LD 14 for pulse pump to a specified value, and an external signal input section 43 which receives a digital signal (for instance, pulse frequency).

The second output controller 42 comprises a pulse output value setting section 42a which sets a peak value of output from the LD 14 for pulse pump to a specified value, a pulse width setting section 42b which sets a pulse width of output from the LD 14 for pulse pump to a specified value, and a pulse generation control section 42c which generates a pulse pump light according to data input from the external signal input section 43.

The external signal input section 43 sends the aforesaid digital signals from outside to the pulse generation control section 42c.

Then, description is made for operations thereof.

At first, a bias pump light 32 at a constant value set by the output controller 41 is generated from the LD 12 for bias pump. Then, the bias pump light 32 is set to a threshold value or more required for pump of the Nd:YAG laser. The bias pump light 32 passes through the polarized beam splitter 16 to be condensed by the condenser lens 18 and enters the Nd:YAG rod 20 to be absorbed therein. The rod 20 is pumped to generate a laser beam 36, a portion of which is output via the output mirror 22 to outside. In this process, output of the bias pump light 32 is kept at a constant level, so that the laser beam 36 output from the Nd:YAG laser is also kept at a constant level.

Next, description is made for a means to obtain a desired "laser beam output value" and a means to obtain a required "relaxation oscillation frequency" of laser beam for removing the relaxation oscillation.

At first, description is made for the means to obtain a "laser beams output value". The LD 12 for bias pump is excited first and the LD 14 for pulse pump is then pumped. When a pulse pump light 34 from the LD 14 for pulse pump is added to the bias pump light 32 from the LD 12 for bias pump, the laser beam 36 output from the Nd:YAG laser increases in proportion to the output value of the pulse pump light 34. Therefore, an output value of the pulse pump light 34 is determined by adjusting the pulse output value setting section 42a so as to obtain a desired output of the laser beam 36. The output value from the LD 14 for pulse pump thus defined is input as a preset value from the pulse output setting section 42a.

Then, the "frequency of laser beam relaxation oscillation" is measured. By adding a pulse pump light is added to the Nd:YAG laser, relaxation oscillation is generated in output from the Nd:YAG laser. The frequency of this relaxation oscillation depends on an output value of the total pump light (for bias pump and pulse pump). Frequency of the aforesaid relaxation oscillation is measured with an appropriate measuring equipment. The cycle is calculated from the frequency of relaxation oscillation. The "cycle of relaxation oscillation" thus defined is entered as a pulse width for suppression of relaxation oscillation from the pulse width setting section 42b.

After the "output value for pulse pump" and the "relaxation oscillation cycle" value are set from the pulse output value setting section 42a and the pulse width setting section 42b, respectively, when an external signal is input to the external signal input section 43, the pulse pump light 34 with the "output value" and the "relaxation oscillation cycle" defined as described above is generated from the LD 14 for pulse pump. Only when this pulse pump light 34 is added to the bias pump light 32, an output value from the Nd:YAG laser increases.

The pulse width set by the section 42b is not necessarily equal to the relaxation oscillation cycle and may be set to an integral number times of the relaxation oscillation cycle.

Figure 2:
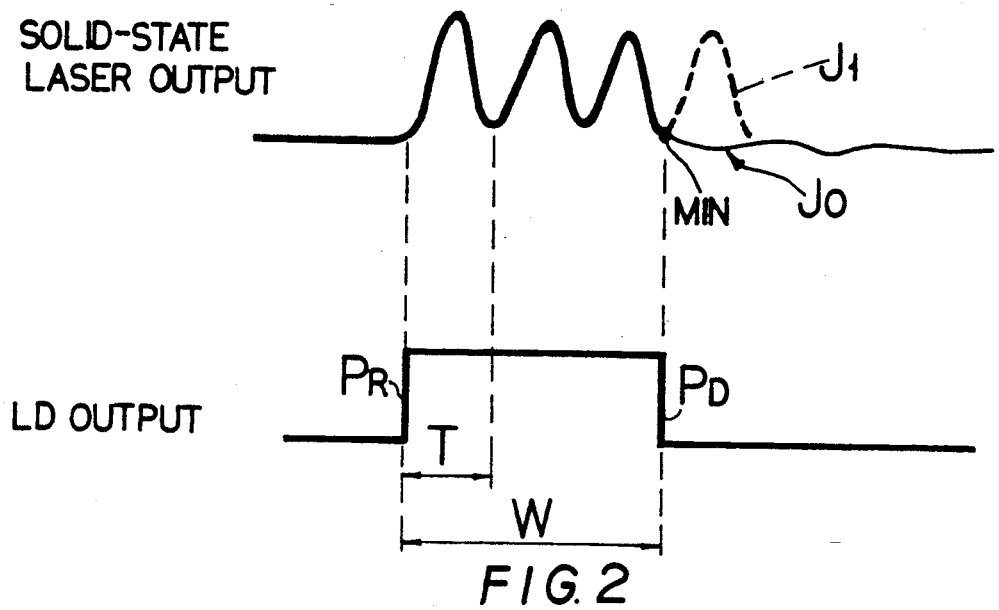
FIG. 2 is a view illustrating an operational principle of this invention.

For example, as shown in FIG. 2, a pulse width W of an output light from an LD is set to three times of a cycle T of relaxation oscillation by the section 42a. By thus setting a pulse width, relaxation oscillation generated by pulse rise $P_R$ is suppressed. In other words, if the time point of pulse fall $P_D$ is conformed to a time point of minimum relaxation oscillation MIN and an original value of output from the LD is reduced, and the population inversion density in the solid-state laser does not increase and is kept at a constant level, and output from the solid-state laser is stabilized as shown by he solid line $J_0$. Note that the dotted line $J_1$ is a case where relaxation oscillation is continued.

For this reason, noise associated with relaxation oscillation can be removed.

1) Confirmation of noise reduction in an experiment

Next, description is made for results of an experiment using the aforesaid solid-state laser oscillator.

When a transmission factor of the output mirror 22 was 1.0%, a threshold value for oscillation of the Nd:YAG laser used in this experiment was 15 mW. When output from the LD 12 for pulse pump was set to 4 mW and output from the LD 14 for pulse pump to 22 mV, a cycle of relaxation oscillation generated at the time of rise was 6.0 μs. This cycle was set and input as a pulse width of the pump light from the pulse width setting section 42b.

Figure 3:
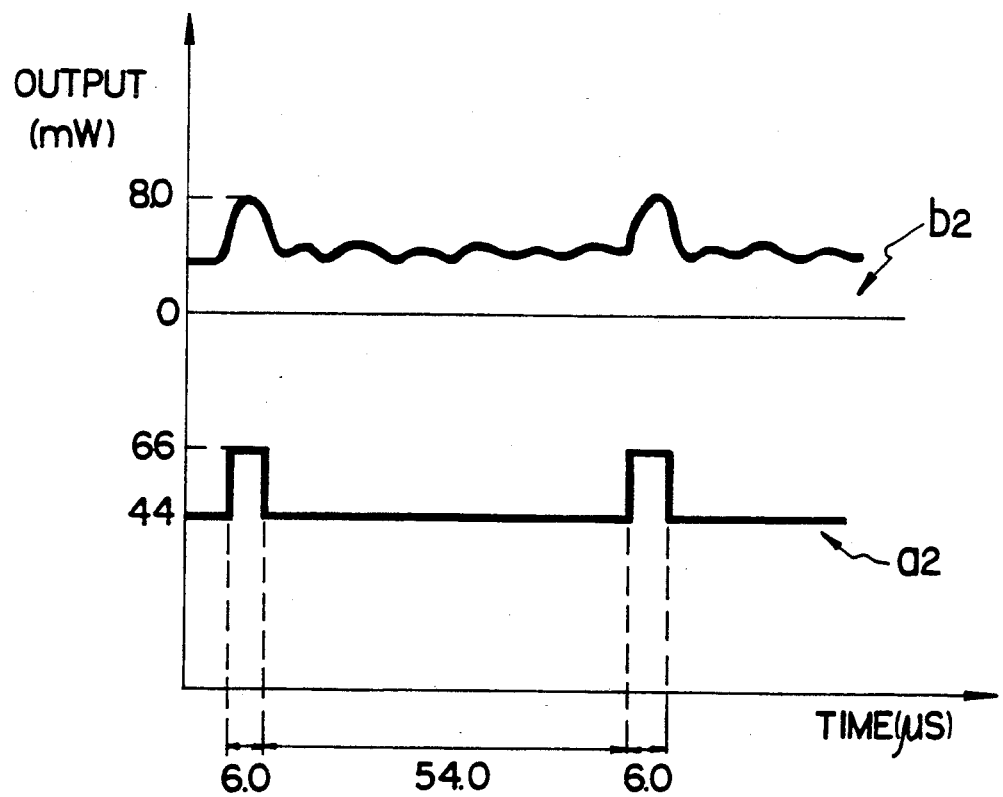
FIGS. 3 to 5 show results of an experiment for the embodiment of this invention and a state where a relaxation oscillation has been suppressed.
Figure 4:
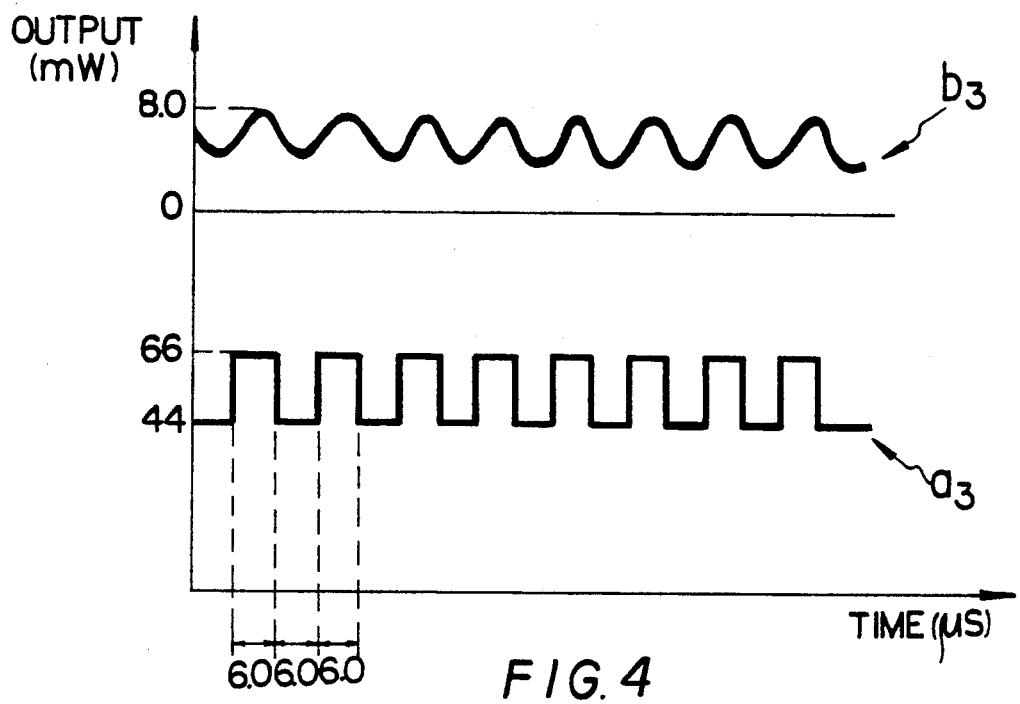

Change of output from Nd:YAG laser when the pulse pump light 34 was added to the bias pump light 32 under the following conditions is shown in FIG. 3, wherein the character $a_2$ indicates output of pump light and the character $b_2$ indicates output from the Nd:YAG laser. FIG. 4 shows a waveform output from the Nd:YAG laser in the case of repeated pulse pump. The character $a_3$ indicates output of pump light, and the character $b_3$ indicates output from the Nd:YAG laser.

Figure 5:
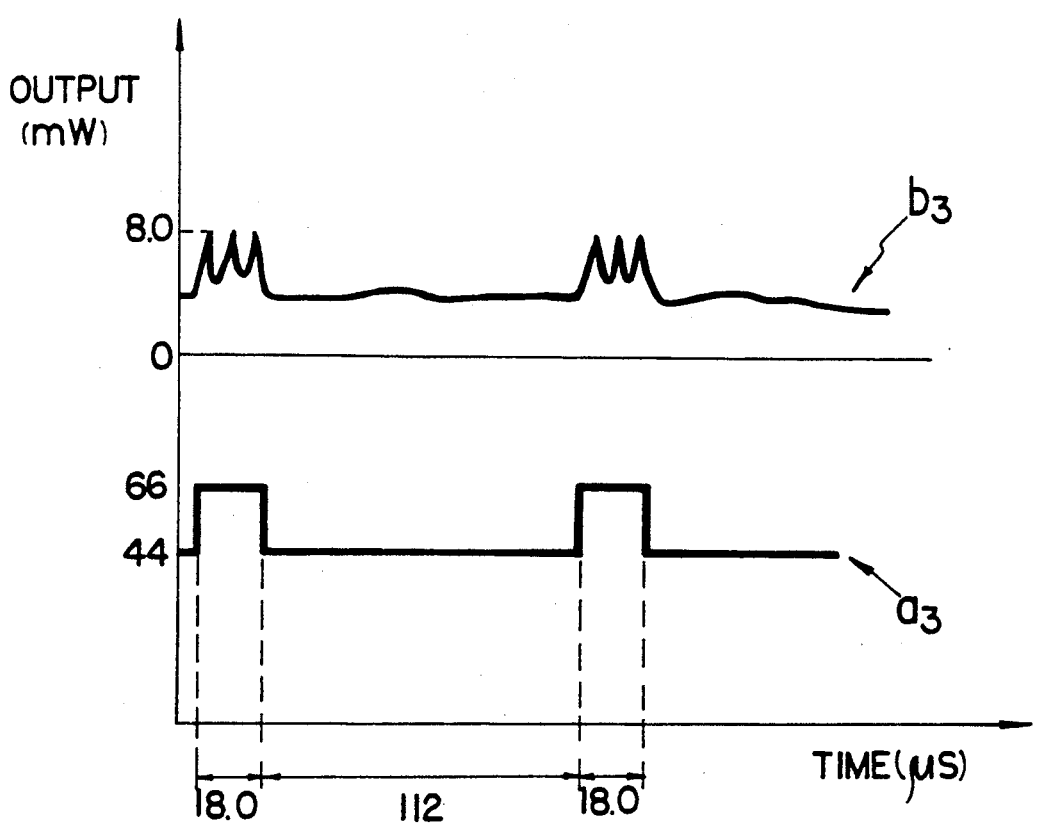
Figure 10:
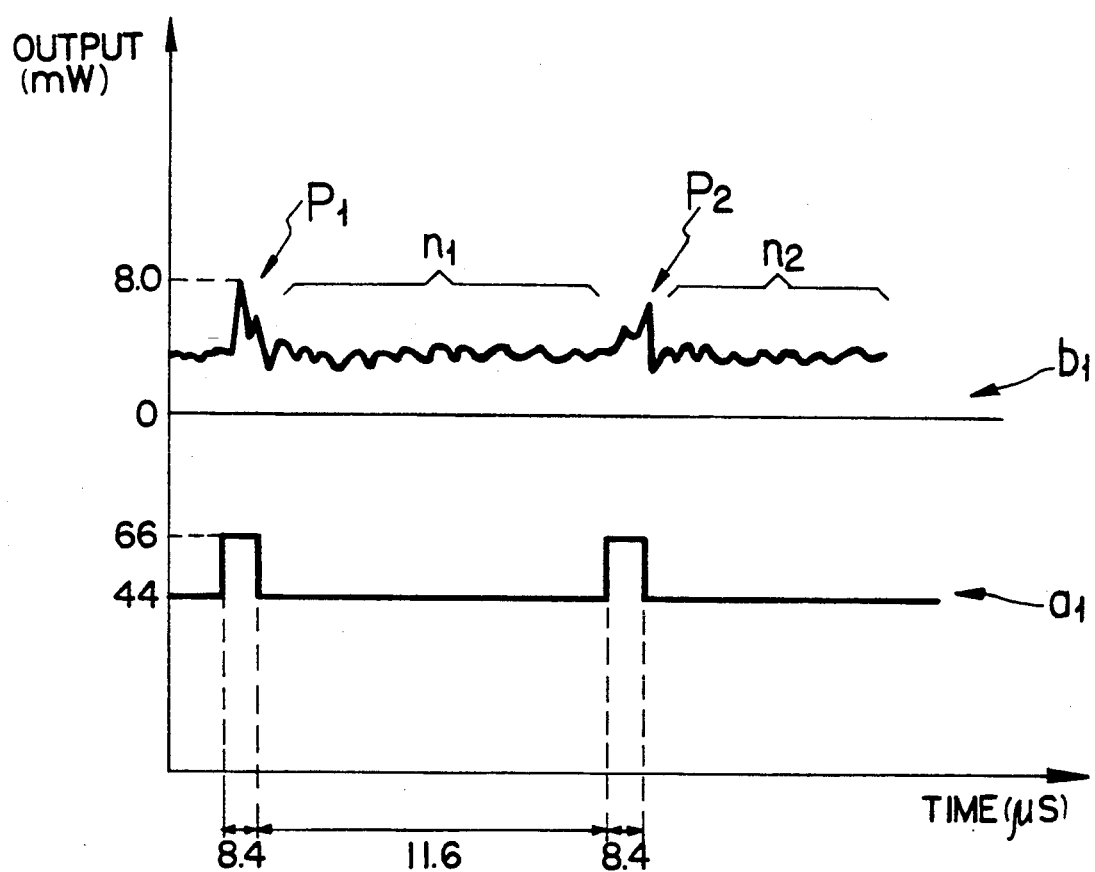
FIG. 10 shows characteristics of time change of output from a solid-state laser based on the conventional technology.

As clearly shown in FIG. 3 and FIG. 4, noise due to relaxation oscillation after fall of the pulse pump is fairly smaller than that in the conventional cases (see FIG. 10). Also, as shown in FIG. 5, in case where a pulse width of a pulse for pump is an integral number times larger than a cycle of relaxation oscillation, the same effect is obtained. Herein, the integral number is in a range from 2 to 5, and in the case shown in FIG. 5, the factor was 3 times (18.0÷6.0=3.0).

Depending on a result of the above-described experiment, it was confirmed that, when a pulse width of pulse pump light is equal to or an integral number times larger than a cycle of relaxation oscillation, noise output from the Nd:YAG laser after fall of the pulse pump light is substantially reduced.

2) Confirmation of noise reduction through theoretical analysis

Suppression of noise due to relaxation oscillation is confirmed by solving simultaneous equations for a relation between a density of photons and a density of population inversion. For convenience of explanation, let us assume a solid-state laser which is a 4-level laser having a homogeneous broaded atomic transition. Also let us assume that a density of population at lower levels can be ignored and the density of population inversion is N(t). Furthermore, it is assumed that a pumping rate to upper levels is R(t) and a time constant indicating a reduction process of atoms at the upper levels other than those emitted through stimulated emission is $\tau$. When a stimulated emission rate for one atom is W(t), the following equation is satisfied.

$$dN(t)/dt = R(t) - W(t)/\tau \tag{1}$$

As W(t) is proportional to a photon density Q(t) in the optical resonator R, so that, assuming a proportion factor of B, the following equation is satisfied.

$$dN(t)/dt = R(t) - BQ(t) \cdot N(t)/\tau \tag{2}$$

Also, as BQ(t) is a percentage of generation of photons, assuming that a time constant for reduction of photons in the optical resonator R, the following equation is satisfied.

$$dQ(t)/dt = BQ(t) - Q(t)/Tc \tag{3}$$

Herein, the following equation is satisfied in a normal state:

$$dN(t)/dt = 0 \text{ and } dQ(t)/dt = 0 \tag{4}$$

So, assuming that N(t), Q(t) and R(t) are then $N_0$, $Q_0$ and $R_0$, respectively, the following equations are satisfied.

$$N_0 = 1/(BT_0) \tag{5}$$

$$Q_0 = (R_0 BT_0 - 1/\tau)/B \tag{6}$$

From the equation (6), a pumping rate $R_{TH}$ when $Q_0 = 0$ is expressed in the following equation;

$$R_{TH} = 1/(BT_0\tau) \tag{7}$$

and, this indicates a pumping rate for the threshold value.

If a pumping factor R(t) is defined as shown below using $R_{TH}$, $$r(t) = R(t)/R_{TH} \tag{8}$$

the equation (2) is expressed as follows.

$$dN(t)/dt = r(t)/(BT_C\tau) - BQ(t)N(t) - N(t)/\tau \tag{9}$$

Thus, the photon density Q(t) can be obtained by solving the simultaneous differential equations (3) and (9). As output from the Nd:YAG laser is proportional to the photon density Q(t), it can be regarded that time change of Q(t) shows time change of output from the Nd:YAG laser. When r(t) is a constant value, the aforesaid simultaneous differential equations can be solved analytically, and the cycle $T_M$ of relaxation oscillation is approximately expressed by the following equation.

$$T_M = 2\pi \sqrt{(r-1)/(T_C\tau)} \tag{10}$$

If r(t) changes as time passes, the equation can not easily be solved analytically, and, in this case, numeric calculation is required.

Figure 6:
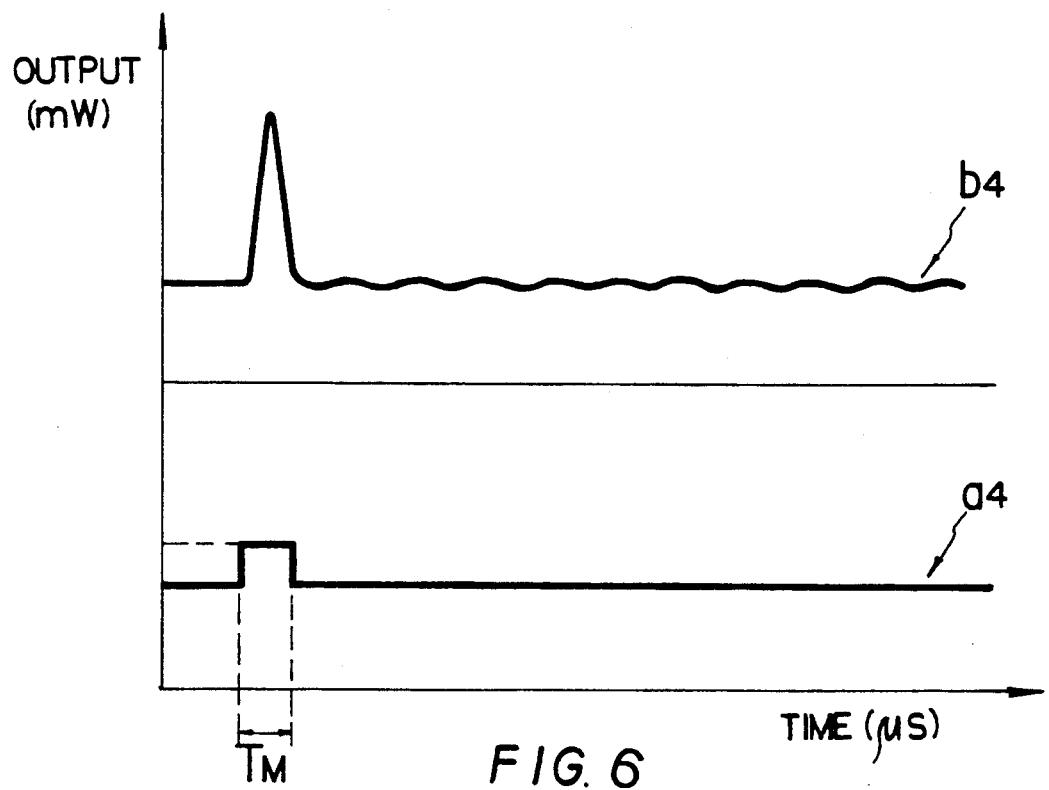
FIGS. 6 to 9 show results of logistic in the embodiment of this invention and a state where the relaxation oscillation has been suppressed, respectively.
Figure 7:
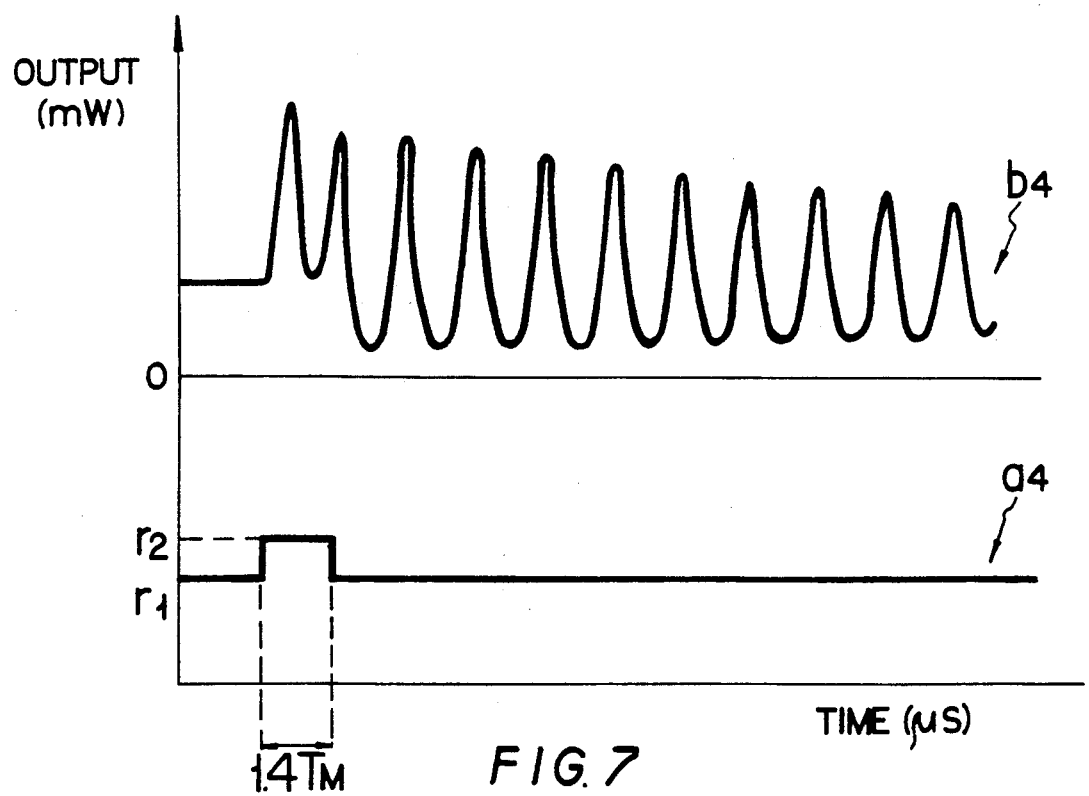

For instance, to raise pump output to $r_2$ for a specified time by adding pulse pump under bias pump at a constant value $r_1$, numerical values are substituted for B, $T_C$ and $\tau$ in the equations (3) and (9), respectively, and Q(t) is calculated according to Runge-Kutta method for each of the following cases assuming that a pulse width of pump light is $T_P$;

(A) $T_P = T_M$
(B) $T_P \neq T_M$ and the result is shown in a form of graph in FIG. 6 and FIG. 7. In these figures, the character $a_4$ indicates time change r(t) of pump light, and the character $b_4$ indicates output from the Nd:YAG laser. Outputs of pump light $r_1$ and $r_2$ were assumed as 2.9 and 4.4, respectively, according to the experimental values.

The results of this calculation shown that noise after fall of a pulse when a pulse width of the pulse pump light is equal to a cycle of recued oscillation ($T_P = T_M$, FIG. 6) is substantially smaller than that when a pulse width of the pulse pump light is not equal to the cycle ($T_P \neq T_M$, FIG. 7). This conforms to results of the experiment (as shown in FIG. 3).

Figure 8:
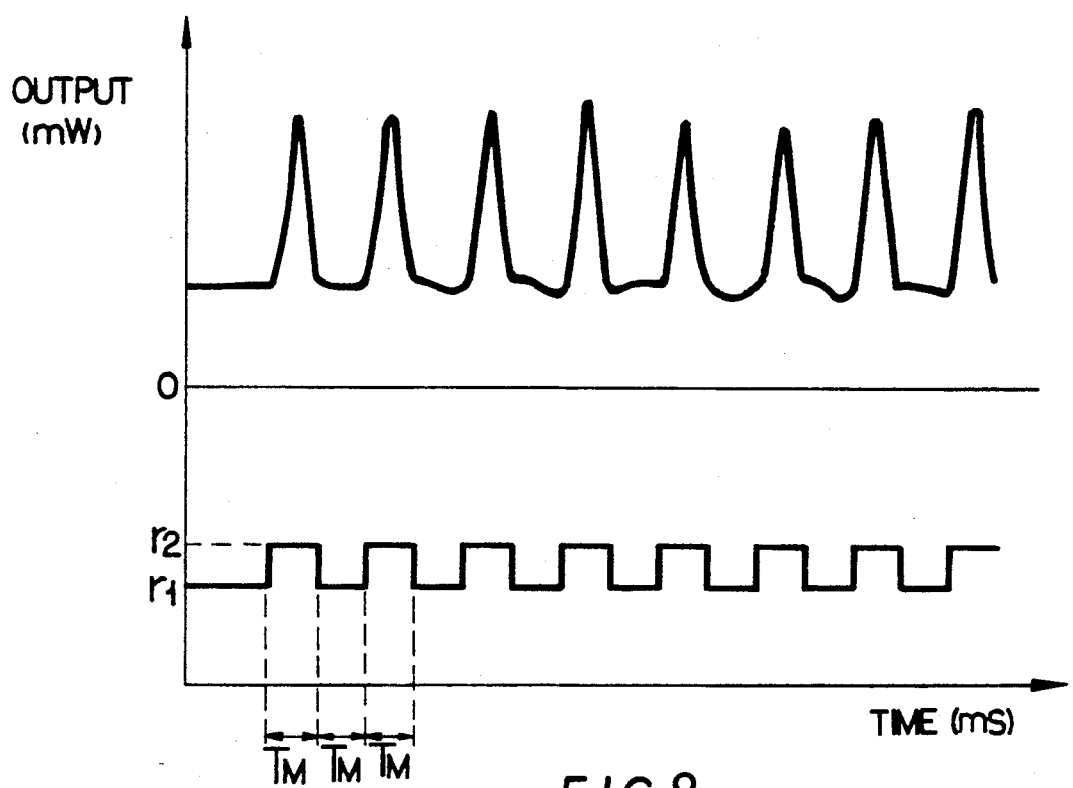
Figure 9:
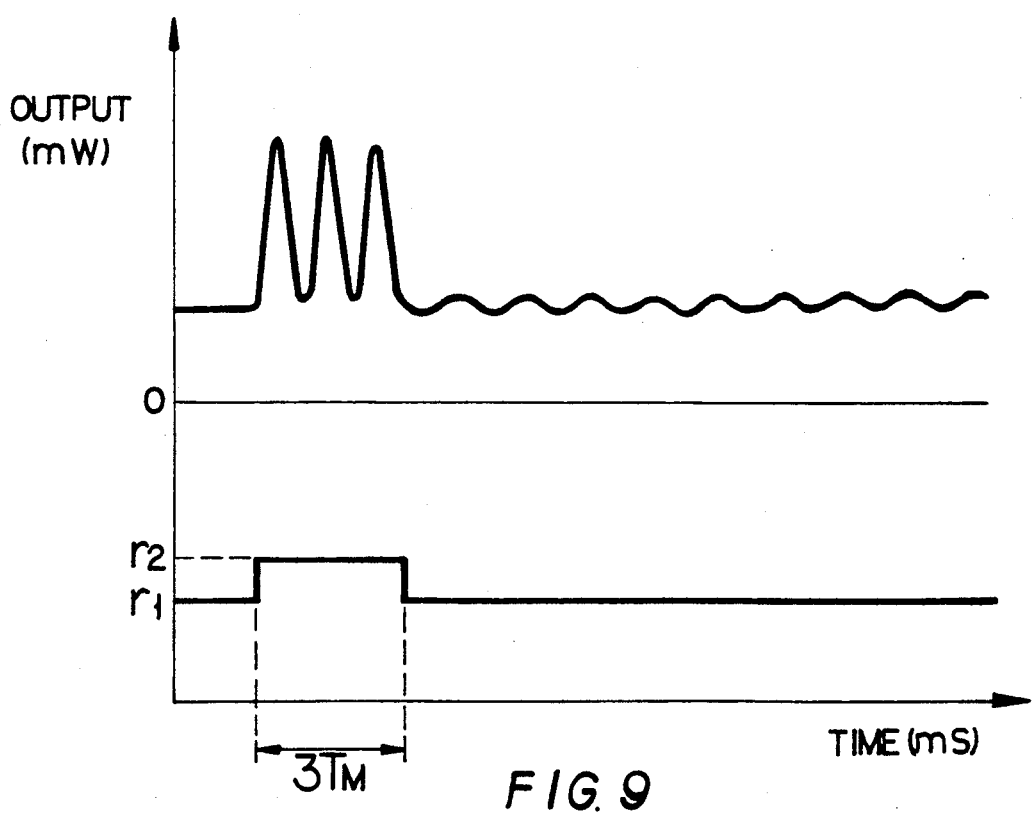

A result of calculation for a case where pump with a pulse width equal to a cycle of relaxation oscillation is repeated, is shown in FIG. 8, and a result of calculation for a case where pump with a pulse width of three times larger than the cycle of relaxation oscillation, is shown in FIG. 9. In both cases, noise after fall of a pulse is suppressed to a low level like results of the experiment (as shown in FIG. 4 and FIG. 5).

As confirmed through the "experiment" and "logistic" described above, in addition to bias pump, by generating pulse pump with a pulse width which is equal to a cycle of relaxation oscillation or an integral number times larger than that, noise after fall of laser beam output can be reduced, and accurate output modulation can be made.

Also, as shown by a two-dot chain line in FIG. 1, by inserting a nonlinear optical crystal C such as KTiOPO$_4$ into the optical resonator R, a secondary harmonic wave or a sum wave can be generated, so that this invention can be applied to modulation of green or blue laser beam.

Note that, in the aforesaid embodiment, two pieces of LD are used, one for bias pump and another for pulse pump. However, this invention can also be applied to a case where one piece of LD is used for both pulse pump and bias pump. In other words, it is allowable that an output light for bias pump is fed from one piece of LD beforehand, an output light for pulse pump with a pulse width equal to a cycle of relaxation oscillation is added to this output light for basis pump, and the output light is fed to a solid-state laser.

Although Nd:YAG is used as a solid-state laser in the aforesaid embodiment, it is needless to say that other appropriate solid-state laser may be used to generate a light with a different wavelength.

As described above, with this invention, generation of relaxation oscillation is suppressed by feeding a pulse pump light with a pulse with which is equal to or an integral number times larger than a cycle of relaxation oscillation, so that output modulation can be made at a high speed and at the same time a solid-state laser oscillator having a compact configuration can be realized.

What is claimed is:

1. A solid-state laser oscillator comprising:
   a solid-state laser medium;
   a pumping laser light generating means comprising a bias pump and a pulse pump for generating a light pulse and inputting said light pulse into said solid-state laser medium by a pulse pumping technique, said pulse pumping technique causing said solid-state laser medium to emit laser light followed by a relaxation of oscillation of said medium, said oscillation relaxation having a frequency and an amplitude; and,
   separate control means for controlling said bias pump and said pulse pump to generate said light pulse with a pulse width equal to an integer multiple of said oscillation relaxation cycle to thereby reduce said oscillation relaxation amplitude.

2. A solid-state laser oscillator according to claim 1, wherein said pumping laser light generating means generates the light pulse having a pulse width equal to one cycle of relaxation of an oscillation of said solid-state laser.

3. A solid-state laser oscillator according to claim 1, wherein said pumping laser light generating means generates the light pulse having a pulse width equal to more than twice a cycle of a relaxation oscillation of said solid-state laser.

4. A solid-state laser oscillator according to claim 1, further comprising:
   an optical resonator including said solid-state laser, and a nonlinear optical element for wavelength conversion; and
   an output mirror disposed at an optical path of the laser light emitted from said optical resonator.

5. A solid-state laser oscillator according to claim 1, wherein said pumping laser light generating means comprises:
   a bias pumping means for generating and inputting a biasing light to said solid-state laser so as to bias said solid-state laser to at least to at least threshold value of said solid-state laser; and
   a pulse pumping means for generating said light pulse.

6. A solid-state laser oscillator according to claim 5, wherein said control means includes a setting means for setting a threshold value of said solid-state laser, and said control means controls said bias pumping means to bias said solid-state laser according to the set threshold value.

7. A solid-state laser oscillator according to claim 5, wherein each of said bias pumping means and said pulse pumping means comprises a semiconductor laser.

8. A solid-state laser oscillator according to claim 5, further comprising a light combining means for combining the biasing light from said pumping means and the light pulse from said pulse pumping means.

9. A solid-state laser oscillator according to claim 8, wherein said light combining means comprises a polarized beam splitter.

10. A solid-state laser oscillator according to claim 5, wherein said control means comprises:
    a first output controller, to which a threshold value is set, for controlling said bias pumping means to bias said solid-state laser according to the set threshold value; and
    a second output controller, to which a pulse width is set, for controlling said pulse pumping means to generate the light pulse having the set light width.

* * * * *